O. N. & A. J. Angell,
Water Wheel.
No. 98,330. Patented Dec. 28, 1869.
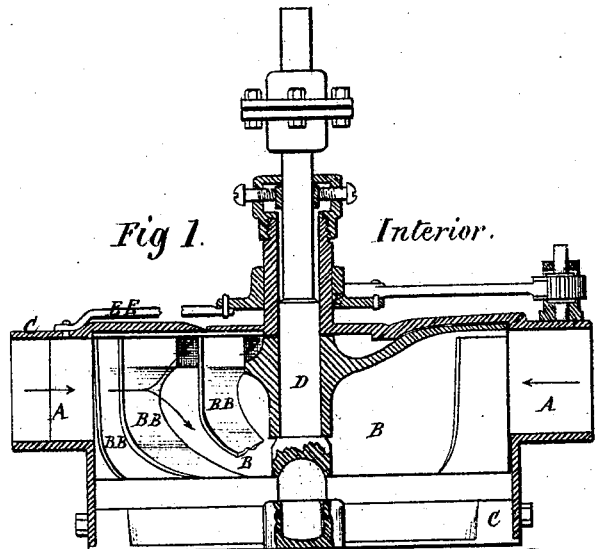
Fig. 1. Interior.
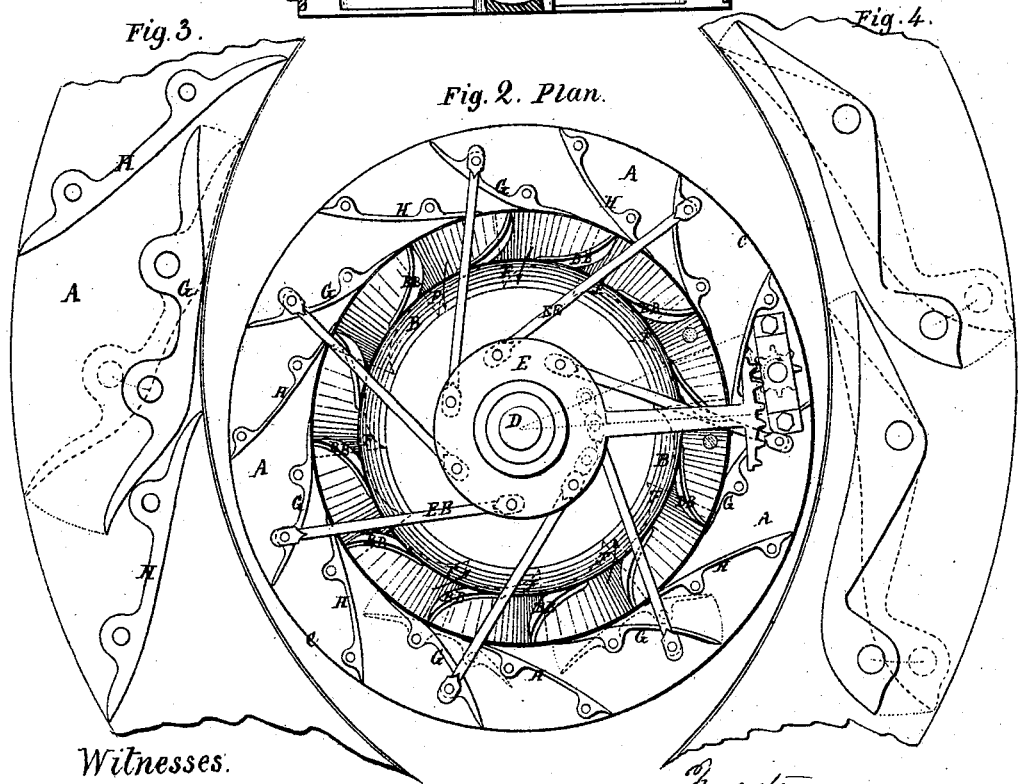
Fig. 3.  Fig. 2. Plan.  Fig. 4.
Witnesses.
Edmund Masson.
Frank A. Jackson.
Inventors
O. N. Angell
A. J. Angell

UNITED STATES PATENT OFFICE.

OTIS N. ANGELL AND ANDREW J. ANGELL, OF PROVIDENCE, R. I.

IMPROVEMENT IN TURBINE WATER-WHEELS.

Specification forming part of Letters Patent No. 98,330, dated December 28, 1869.

*To all whom it may concern:*

Be it known that we, OTIS N. ANGELL, of the city and county of Providence, and ANDREW J. ANGELL, of the said city of Providence and county of Providence, and State of Rhode Island, have invented a certain new and useful Improvement in Turbine Water-Wheels.

Our invention consists in the use of eduction-ports, in combination with single buckets of a peculiar form, so arranged as to cause a horizontal, as well as a vertical or downward, discharge of water during the operation of the wheel; and we do hereby declare that the following specification, taken in connection with the drawings furnished and forming a part of the same, is a true, clear, and exact description thereof.

Figure 1 represents in vertical section the interior of one of our improved wheels. A is that part of the casing encircling the wheel containing the valve-gates and guides, but which in this view cannot well be shown. B is the water-wheel proper. C is the outer case, containing the wheel, a portion of the interior of which is marked A. D is the spindle or wheel-shaft, supported by a step in the usual manner. E is a collar, to which the valve-levers (marked E E) are attached, the whole being operated by a rack-lever and pinion. As no novelty resides therein, further explanation thereof is deemed unnecessary. B B are the buckets. They are provided with a peculiar curvature, as shown, at their tops. F in each case designates the eduction-ports or water-passages cut in the rim of the wheel, between each bucket. The double-headed arrow in this figure designates the two directions taken by the water in its passage through the wheel. It will be observed that the upper portion of the buckets are constructed with a peculiar curvature, arranged in relation to the ports F, for the purpose of directing the flow of water thereto.

Fig. 2 represents one of our wheels in ground section or plan. Parts lettered as in Fig. 1 will not again be specifically referred to. G in each case represents the valve-gates, operated by the valve-rods E E and rack-lever, already referred to. H in each case represents stationary guides, placed alternately between the valves G, and so constructed as to fill vertically the space between the upper and lower portions of the wheel-casing, through which water flows to the wheel. These stationary guides, in combination with the movable valve-gates, also constitute a part of our invention. The arrows placed adjacent therewith indicate the direction taken by the water. In the lower portion of this figure the position of the valve-gates when open and closed and their relation to the guides is clearly shown by dotted lines.

Fig. 3 represents that portion of the interior of the casing marked A, the valve-gates G, and guides H upon a larger scale than in Fig. 2. The guides in their relative position with the valves open and closed are here fully exhibited, the dotted lines indicating their line of motion.

Fig. 4 represents valve-gates as heretofore constructed for this class of wheel.

To persons skilled in the art the mode of operation of a wheel constructed and arranged as here described is too obvious to require further description.

We are aware that turbine water-wheels have been heretofore constructed with a double set of buckets, the upper set discharging horizontally and the lower set vertically or downward; but we are not aware that any provision has heretofore been made for a horizontal and vertical discharge of water in connection with a single set of buckets, each bucket being so formed and arranged as to direct the water in both directions, imparting force and power in its transit. The value of properly directing water into a turbine wheel of this class has long since been conceded by practical mill-wrights.

Having thus described our invention, we wish it distinctly understood that we make no claim to the mechanism shown for operating the gates, nor the gates themselves, nor for the general arrangement of the wheel and its casing, as such have long been in use; but

What we do claim as new, and desire to secure by Letters Patent of the United States, is—

1. The brackets B B, formed, substantially as described, with an inward horizontal and a downward discharge arranged in relation to and in combination with the eduction-ports F, as shown and specified.

2. The improved turbine wheel herein described, provided with the buckets B B and the ports F, in combination with the valve-gates G and the stationary guides H, the parts being arranged and operating substantially as described, for the purposes specified.

OTIS N. ANGELL.
ANDREW J. ANGELL.

Witnesses:
JOHN D. THURSTON,
PETER F. HUGHES.